Patented Aug. 24, 1954

2,687,380

UNITED STATES PATENT OFFICE 2,687,380

REGENERATION OF A SILVER CATALYST USEFUL IN THE PREPARATION OF ETHYLENE OXIDE

Alfred Saffer, Floral Park, N. Y., assignor to Chempatents, Inc., New York, N. Y., a corporation of Delaware No Drawing. Application May 1, 1950, Serial No. 159,371

7 Claims. (Cl. 252—411)

The present invention relates to improvements in processes for the oxidation of olefins by direct catalytic oxidation with oxygen and has particular reference to a method for activating catalysts which have deteriorated in use through poisoning or otherwise or which are characterized by initially low catalytic activity.

The direct oxidation of olefins such as ethylene normally is carried out by passing a gaseous reaction stream comprising ethylene and oxygen through a reaction zone provided with a suitable surface catalyst, such as silver. The reaction may be carried out in the presence of inhibitors which assist in the control of the rate and heat of reaction. With commercial processes, normally it is found that the catalyst becomes poisoned due in some instances to the presence of impurities in the reaction system such as halogen compounds, sulfur compounds, and oxidation products of higher hydrocarbons, or the accumulation of residue on the catalyst surfaces which decelerates the rate of reaction and efficiency of the catalyst. It is accepted practice periodically to revive spent catalyst in order to maintain the overall efficiency of the process, and to this end many special chemicals have been developed which effectively stimulate the activity of the catalyst. These catalyst reactivating materials involve undesirable additional cost, and very frequently require that the ethylene oxidation system be closed down for substantial periods of time to permit cleansing of the system, the catalyst being removed from the reactor tubes. In addition, the reactivating materials may contaminate the ethylene oxide and product.

It is an object of the present invention to provide a method for the reactivation of catalysts employed in the oxidation of olefins wherein the reaction system is maintained free of contaminants and wherein the revived catalysts may be employed immediately subsequent to reactivation, without further treatment.

A further object is to provide a convenient and economical method for the activation of catalysts employed in the oxidation of ethylene or other olefins which is accomplished using products of the oxidation reaction only, whereby the overall cost of the catalyst reactivation phase of the method is materially reduced.

A further object is to provide a simple and inexpensive method for the activation of silver surface catalysts employed in the oxidation of ethylene, employing ethylene oxide as the reactivating agent, the catalyst treatment being accomplished in the reactor tubes without disturbance of the system.

Other objects and advantages of the invention will be apparent from the following detailed description thereof.

In its broadest application, the invention embodies the treatment of surface catalysts employed in the direct oxidation of olefins, with a gaseous flow of olefin oxide, preferably ethylene oxide, to reactivate the catalyst to high conversion and selectivity ratios. The process does not require the use of specialized equipment or materials foreign to the starting materials employed in the oxidation reaction. The invention results in a marked increase in the overall yield of olefin oxidation system, eliminating the usual periodic plant shutdowns for purposes of treating the catalyst to increase its activity.

The invention is particularly useful in connection with the direct oxidation of ethylene found in dilute concentrations in commercial gases such as is disclosed and claimed in application Serial No. 159,839, filed May 3, 1950.

The invention is also of particular utility when employed in connection with the reactivation of the novel silver surface catalyst consisting of silver deposited on spherical supports having roughened surfaces, disclosed and claimed in application Serial No. 126,246, filed November 8, 1949. However, the invention is readily adaptable to use with conventional olefin oxidation processes, and the silver surface catalysts normally used in these processes, and will be described herein in connection with a standard type process wherein ethylene and oxygen are passed as a gaseous reaction stream over a surface catalyst of silver on alumina or other support, or silver activated by the addition of small amounts of gold, copper and other materials conventionally employed for this purpose. The utility of the invention is not restricted by the presence of inhibitors such as the halogens which may be present in small amounts in the gaseous reaction stream.

In general, surface catalysts which contain silver in any form may be effectively treated in accordance with the invention to markedly increase or restore the initial activity of the catalyst. Normally, the catalysts are prepared and introduced into the reaction system within reactor tubes, the gaseous reaction stream being passed through the tubes at temperatures of 220°–350° C. Superatmospheric pressures may be employed advantageously. The reactor tube may be dimensioned twenty feet in length with a one inch internal diameter, being packed for example nineteen feet deep with catalyst particles.

It has been discovered that an unexpectedly effective material for the reactivation of a silver surface catalyst which has deteriorated in use, or by contact with atmospheric poisons, is ethylene oxide. The treatment involves the passing of ethylene oxide over the catalyst under the normal conditions of the olefin oxidation reaction, to restore catalyst activity and efficiency, or to incur greater efficiency in a catalyst prior to use. The ethylene oxide is an end product component of the basic process, and accordingly is readily available as a catalyst reactivation agent for this purpose in the plant. The reactivation step may be accomplished by interrupting the flow of olefin, as by shutting down the olefin oxidation system temporarily, and passing a gaseous stream containing a small amount of ethylene oxide through the reactor tubes. It has been found that substantially complete recovery of catalyst is accomplished after a short period of contact with ethylene oxide, whereupon the gaseous reaction stream of olefin and air may be reintroduced into the system and the direct oxidation process continued.

It has also been found that advantageous results are obtained by introducing small amounts of ethylene oxide into the reactor feed gases comprising ethylene and oxygen, prior to introduction into the reaction zone. The ethylene oxide may be fed into the feed gas stream intermittently or continuously. The presence of ethylene oxide in the feed gases has the effect of promoting the activation of the catalyst, which attains an unusually high peak of activity and maintains the same for a considerable length of time. It may be found that during the period of admission of ethylene oxide, there will be a temporary drop in the selectivity of the catalyst, but this effect is eliminated when the introduction of ethylene oxide is stopped. The introduction of ethylene oxide into the reactor feed gases is particularly effective when halogen inhibitors such as chlorine are present. Normally, the ethylene oxide component may be added to the reactor feed gases in amounts of above about 0.8 up to about 4% by volume of the gaseous mixture.

The ethylene oxide reactivation may be accomplished in the presence or absence of oxygen. The amount of ethylene oxide employed in the reactivation step should be such that the concentration of ethylene oxide in the gaseous stream preferably is below the inflammability limit, if oxygen is present. Normally, this will approximate 3% ethylene oxide, where air forms the major component of the gaseous stream. Larger amounts of ethylene oxide may be employed if an oxygen-free inert gas such as nitrogen is used as a major component of the gaseous stream. In this case, the upper limit of ethylene oxide component is dictated by requirements of economy in the process.

The activation of the catalyst with ethylene oxide preferably is carried out under the reaction conditions present in the system. Thus, where temperature and pressure conditions are established in the direct oxidation of the olefins, these identical conditions of temperature and pressure may conveniently be maintained in the system for the regeneration step. The regeneration process is operative however, at atmospheric pressures as well as superatmospheric pressures. Where silver surface catalysts are employed, care should be taken that conditions of temperature do not exceed the point of thermal stability of the catalyst, which may result in permanent deterioration. Thus, for example, the activation step may safely be carried out at a temperature of from 220° C.–350° C. a more effective temperature for most of silver surface catalysts being approximately 240 to 350° C. Pressures of from 5 to 25 atmospheres may be employed.

As pointed out above the amount of ethylene oxide employed in reactivating the spent catalyst may vary within wide limits determined by economical considerations and in the case where air is employed in the gaseous stream, by the explosion hazard. The ethylene oxide may be introduced or injected into the air stream or stream of inert gas, whichever is used, as the gaseous stream enters the reaction system, in amounts which will vary in accordance with the amount and type of catalyst under treatment, the size of the reactor tubes, the types of contaminants found on the surface of the catalyst, and other factors. The effectiveness of the reactivation treatment in any instance is best determined by removing a sample of the catalyst from the reactor tubes and testing it to determine its degree of operativeness.

As a specific example of the method of invention, a conventional silver surface catalyst was prepared by precipitation of silver oxide upon 2 to 4 mesh alumina supports. The prepared catalyst was incorporated in a reactor tube one inch in internal diameter and four feet long, the packing being forty two inches deep. A reactor feed gas compound of ethylene and oxygen was passed through the tube at a rate of approximately 0.2 feed per second mased upon the empty tube at atmospheric pressure, the ethylene being present in an amount approximately 5% by volume. After a ten hour period of operation a yield of ethylene oxide of 16% was obtained, with a selectivity of only 32% and conversion of 50%.

A gaseous reaction stream consisting of an inert gas containing 4% ethylene oxide by volume, was then passed through the reactor tube for a period of two hours, under the same operating conditions as were employed in the oxidation reaction.

The original gaseous reaction mixture of 5% ethylene and air was then passed through the tube and the reaction carried on for a one hour period. At this time, measurements were again taken and the conversion factor was 42% with selectivity at 68%, with yield of 28%.

In a second test, alumina spheres ⅜″ in diameter coated with silver and barium lactate, were employed. The following results were observed:

| | Yield, percent | Selectivity, percent | Conversion, percent |
|---|---|---|---|
| Before Olefin Oxide treatment | 12 | 33 | 34 |
| After 2 hour Oxide treatment | 22 | 63 | 35 |
| (the test being made six hours after regeneration) | 23 | 63 | 36 |
| (the test being made 12 hours after regeneration) | | | |

This test was repeated several times and it was found that the silver surface catalyst was markedly revived particularly as to selectivity, with treatment with ethylene oxide in the manner described.

The concept of activation and reactivation of catalysts employed in the direct oxidation of olefins, with ethylene oxide, is applicable to all forms of silver surface catalysts, including catalysts which have been promoted by the addition of metals such as gold, copper or by barium compounds, for example. It will be appreciated that the invention may be varied from the procedures described and is capable of applications which have not been referred to specifically herein. Accordingly the invention is to be limited only as defined in the appended claims.

I claim:

1. A method of increasing the activity and efficiency of a silver surface catalyst useful in the preparation of ethylene oxide by the partial oxidation of ethylene with gaseous oxygen, the activity and efficiency of said catalyst being lower than its potential high activity and efficiency, which method comprises contacting said catalyst at a temperature in the range of 220 to 350° C. with a gaseous mixture containing above about 0.8 up to about 4% by volume of ethylene oxide, the latter being the essential agent for increasing said activity and efficiency, the output of ethylene oxide from any feed gases in said mixture being insufficient to provide the said amount thereof, whereby an improved catalyst is obtained.

2. A method of claim 1, wherein the gaseous mixture consists of the ethylene oxide and oxygen-free inert gas.

3. A method of claim 1, wherein the gaseous mixture consists of the ethylene oxide and air.

4. A method of claim 1, wherein the gaseous mixture consists of the ethylene oxide and reactor feed gas composed essentially of oxygen and about 5% ethylene.

5. A method of activating surface catalysts used in the direct oxidation of ethylene to ethylene oxide employing a reactor feed gas composed essentially of ethylene and oxygen as reactants, comprising initially contacting the catalyst with ethylene oxide in the absence of the reactor feed gas, and upon resumption of the oxidation reaction introducing a minor portion of ethylene oxide into the reactor feed gas prior to entry into the catalyst zone.

6. In the method set forth in claim 5, the ethylene oxide being introduced into the reactor feed gas in an amount less than 0.1% by volume.

7. A method of activating catalysts used in the direct oxidation of ethylene to ethylene oxide employing a reactor feed gas composed essentially of ethylene and oxygen as reactants, comprising first contacting the catalyst with ethylene oxide in the absence of reactor feed gas, and then introducing a minor proportion of ethylene oxide into the reactor feed gas as it is introduced into the catalyst zone.

References Cited in the file of this patent

UNITED STATES PATENTS

| Number | Name | Date |
|---|---|---|
| 2,219,575 | McNamee et al. | Oct. 29, 1940 |
| 2,479,885 | West | Aug. 23, 1949 |